United States Patent

[11] 3,562,473

[72] Inventors Erman V. Cavagnero;
Joseph F. Loftus, Torrington, Conn.
[21] Appl. No. 721,672
[22] Filed Apr. 16, 1968
[45] Patented Feb. 9, 1971
[73] Assignee The Torrington Manufacturing Company
Torrington, Conn.
a corporation of Connecticut

[54] MACHINE FOR PRODUCING BEARINGS AND THE LIKE FROM STRIP STOCK
23 Claims, 18 Drawing Figs.

[52] U.S. Cl. .................................................. 219/64, 219/160
[51] Int. Cl. .................................................. B23k 1/16
[50] Field of Search ...................................... 219/59, 64, 79, 80, 160, 101

[56] References Cited
UNITED STATES PATENTS
1,351,445  8/1920  Smith .......................... 219/160
2,004,787  6/1935  Gillette ......................... 219/160
2,620,420  12/1952 Abbott .......................... 219/160X
2,952,231  9/1960  Chyle et al. ................... 219/160X
3,439,142  4/1969  McGean et al. ............... 219/64X Primary Examiner—J. V. Truhe
Assistant Examiner—L. A. Schutzman
Attorney—McCormick, Paulding & Huber ABSTRACT: A high production machine of the vertical four-slide type for intermittently advancing strip stock, severing blanks therefrom, forming the same into bearing races and welding end portions thereof together. The machine has a projecting horizontal mandrel with three work stations therealong respectively for preforming, forming, and preheating and/or welding. A cutoff anvil, transfer pins, broaching tools, and an expandable mandrel section are provided all with rear motion drive action and a welding mechanism is adapted for both preheat and weld operation adjacent the expandable mandrel section. A bearing race discharge track extends from the welding station to an induction furnace.

INVENTORS
ERMAN V. CAVAGNERO
JOSEPH F. LOFTUS 3,562,473

MACHINE FOR PRODUCING BEARINGS AND THE LIKE FROM STRIP STOCK

BACKGROUND OF THE INVENTION

This invention relates generally to a machine of the four-slide type and, more specifically, to a four-slide machine particularly adapted to produce welded bearing races and the like from strip stock at a high rate of production and at economic advantage. High production machinery for producing commercially acceptable welded bearing races from strip stock has not heretofore been available.

SUMMARY OF THE INVENTION

It is the general object of the present invention to provide a machine of the type mentioned wherein bearing races and the like, as well as other workpieces, can be formed from blanks severed from strip stock in a high speed operation and in a highly efficient and precise manner.

In fulfillment of this object, a four-slide machine is provided with the conventional hub-spoke tool arrangement about a center form or mandrel and; in addition, a plurality of additional tools or workpiece engageable devices are provided adjacent the mandrel and at least some of said devices are driven by suitable actuating or operating means disposed on a side of the machine frame opposite the mandrel. The additional tools or devices may comprise a movable mandrel part which in the preferred form comprises an expansion device operable in association with welding electrodes and clamps for preheat and weld operations. Further, one of said additional devices or tools may comprise a broaching tool operable upon end portions of a bearing race or other workpiece prior to preheating and/or welding of the workpiece. The expansion device has general utility but is particularly adapted to the manufacture of high carbon steel bearing races requiring a preheat-weld operation and the broaching tool finds advantage in the manufacture of both high and low carbon steel bearing races in the provision of clean, freshly exposed surfaces immediately prior to welding. Each of the devices mentioned is also usable to advantage in the manufacture of a wide variety of products other than bearing races and, accordingly, the invention is not to be construed as limited to any specific type of workpiece or machine product.

BRIEF DESCRIPTION OF THE DRAWING

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

FIG. 15 is a somewhat schematic illustration showing an end portion of a center form or mandrel, a discharge track, a retaining device, and an induction furnace.

DESCRIPTION OF THE PREFERRED EMBODIMENTS

General Organization

Figure 1:
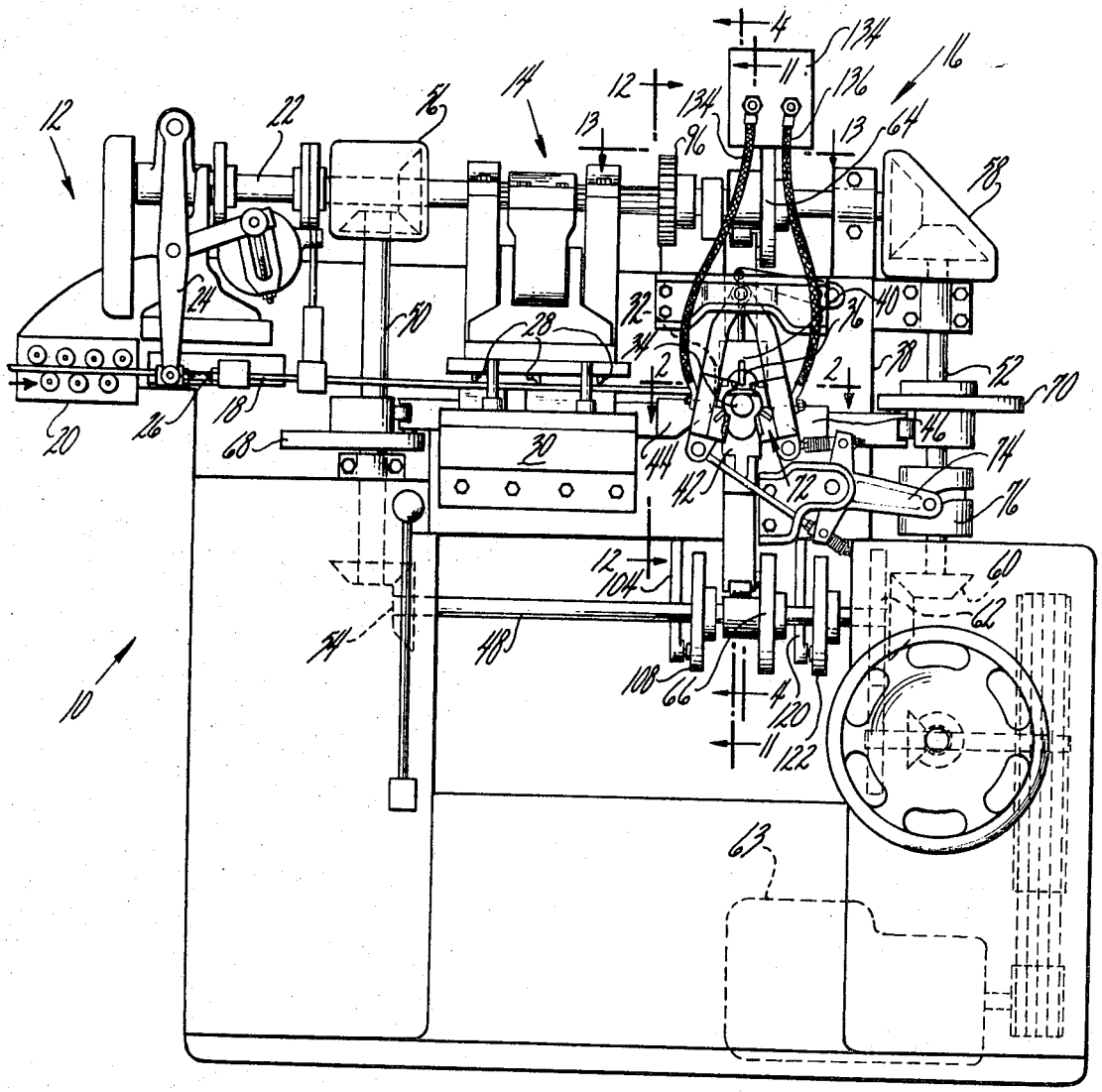
FIG. 1 is a front elevational view of a vertical four-slide machine constructed in accordance with the present invention.

In the drawings a four-slide machine of the vertical type is illustrated and will be described hereinbelow. It should be noted, however, that the invention is not limited to vertical four-slide machines and that directional or geometrical terms such as "vertical," "horizontal," "front," "rear," "forwardly," "rearwardly," etc. are employed for convenience of description only and are not to be taken as limitations in the specifications or in the claims which follow.

Referring particularly to FIG. 1, a vertical four-slide wire or strip forming machine is indicated generally at 10 with a cyclically operable intermittent feed mechanism 12 at a left-hand position, a cyclically operable press section 14 approximately at a central position, and a cyclically operable forming and welding section 16 at a right-hand position. Wire or strip generally indicated at 18 passes from left to right in the machine and is initially introduced to a straightener 20 which may be of conventional design and construction. The strip 18 is of a cross-sectional configuration conforming to that of a finished bearing race and the machine 10 will be described in conjunction therewith. It is to be noted, however, that the feed mechanism 12, the press section 14 and the forming and welding section 16 may be adapted to handle wire or strip having various cross-sectional configurations. Accordingly, terms such as "wire" and "strip" are to be construed in a broad sense and as reflecting the capability of the machine in handling a continuous tread or slender rod of metal of any cross-sectional shape such as round, square, triangular, flat or irregular.

The feed mechanism 12 is operated from suitable cams and gears driven by an upper horizontal cam shaft 22 and includes an oscillable lever 24 and an associated grip and release mechanism 26 which intermittently feeds the strip 18 rightwardly along a horizontal and longitudinally extending path to the press section 14 and the forming and welding section 16. For further illustration and description of the feed mechanism 12, reference may be had to Werner Vogt U.S. Pat. No. 3,052,392 entitled "Wire Forming Machine."

The press section 14 is driven from the upper cam shaft 22 and includes cam or eccentric operated press tools 28, 28 which cooperate with a die or anvil unit 30. In the manufacture of bearing races on the machine 10, the press tools serve to provide transversely elongated slots between connecting marginal portions and which partially define race end portions in the strip 18. Further, the tools 28,28 are adapted to form the partially defined end portions as required for accurately sizing the finished race and efficiently welding together the end portions thereof. A presently preferred form of bearing race end portion shaping is illustrated and further explained in copending U.S. Pat. application Ser. No. 706,217, entitled, "Welding Method For Bearing Races and Other Articles" in the name of Erman V. Cavagnero.

As the strip 18 is further advanced from left to right from the pressing section 14 leading end sections thereof are severed at the aforesaid transverse slots by a vertically reciprocable cutoff tool 32. Severed leading end sections form workpieces or bearing race blanks disposed adjacent a center form or mandrel 34 and which are held in position for forming about the mandrel by means of a stock clamp or check 36. As shown, the center form or mandrel 34 extends generally horizontally forwardly from a vertical machine frame 38 and the stock check 36 is associated with but operable independently from an upper vertically reciprocable tool 40 which cooperates with the mandrel 34. A lower vertically reciprocable tool 42 and left- and right-hand horizontally reciprocable tools 44, 46 also cooperate with the mandrel 34 in forming a bearing race blank or other workpiece. As will be apparent, the tools 40, 42, 44, and 46 are arranged generally in a hub-spoke configuration in a vertical plane about the mandrel 34 for reciprocation toward and away from the mandrel. Suitable slides are provided for the tools 40 to 46 and are driven from the aforementioned upper horizontal cam shaft 22, a lower horizontal cam shaft 48 and vertical left- and right-hand cam shafts 50, 52. The cam shafts are arranged in parallel pairs in a vertical-horizontal rectangular configuration and generally in a vertical plane. Suitable bevel gear connections are provided between the cam shafts at 54, 56, 58 and 60 for rotation of the shafts in unison. A driving connection for the lower horizontal cam shaft 48 is provided in the form of an appropriate gear 62 rotated indirectly from a power operating means which may take the form of an electric motor 63. Cams 64, 66, 68 and 70, respectively mounted on the shafts 22, 48, 50 and 52, operate the tools 40, 42, 44 and 46 in timed relationship with other machine elements.

A welding mechanism 72 at the forming section 16 cooperates with the mandrel 34 in preheat and/or weld operations on workpieces. The welding mechanism is driven by an oscillable lever 74 and a cam 76 on the shaft 52, and will be described more fully hereinbelow.

Rear Mandrel Work Station

In the manufacture of welded bearing races, the machine of the present invention is preferably provided with a series of work stations along the mandrel 34 extending from a rear portion thereof to a front portion thereof, and there is also preferably provided a transfer device for advancing workpieces forwardly along the mandrel in timed relationship with the operation of tools at the several work stations.

Figure 2:
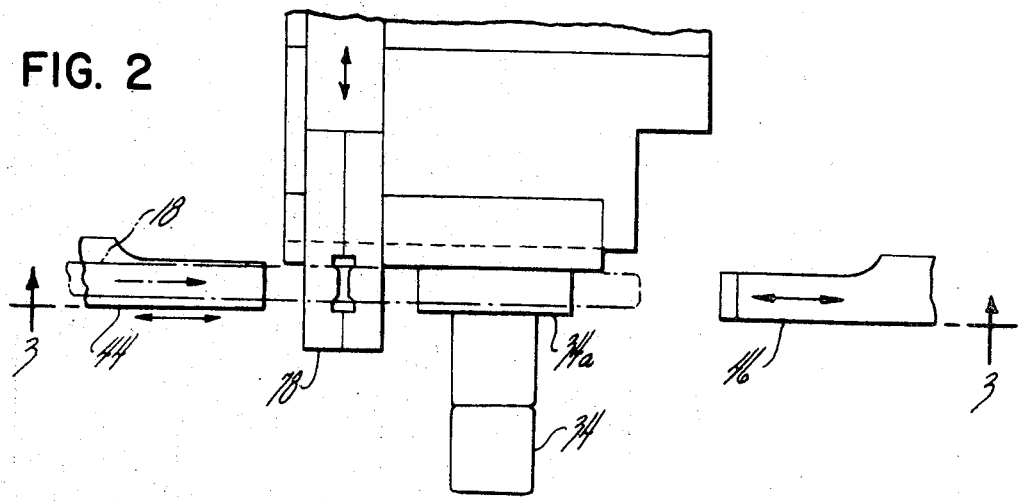
FIG. 2 is an enlarged fragmentary horizontal section taken generally as indicated at 2—2 in FIG. 1 with parts omitted for clarity of illustration.
Figure 3:
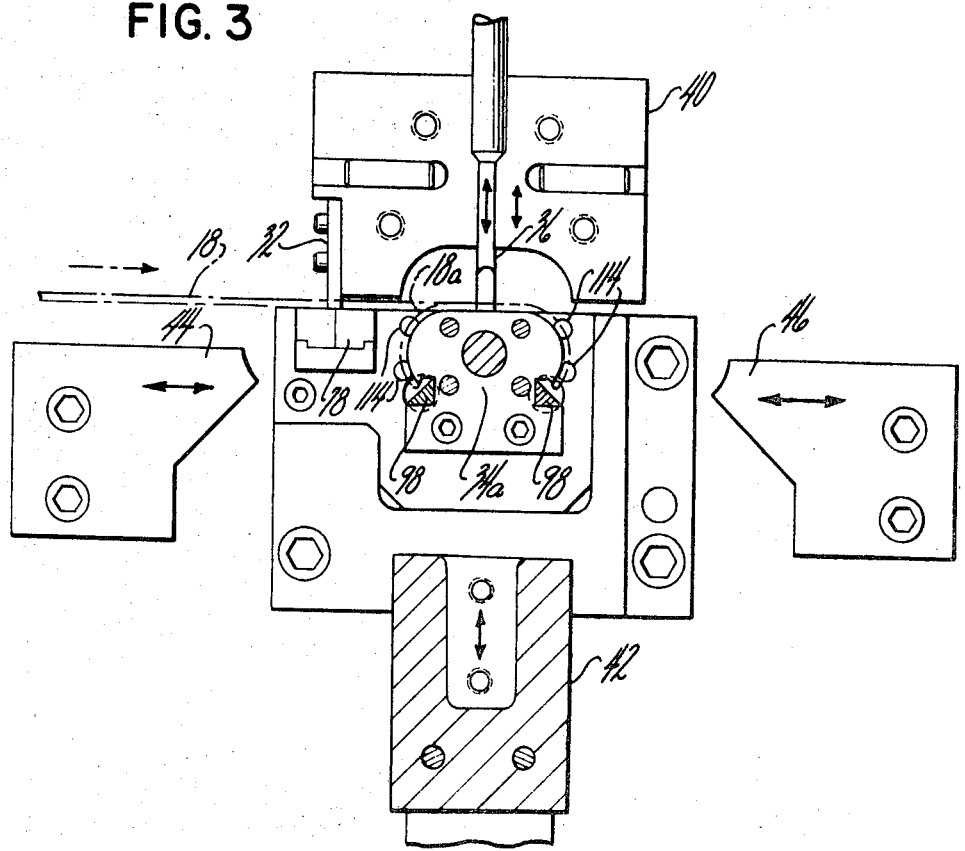
FIG. 3 is an enlarged fragmentary vertical section taken generally as indicated at 3—3 in FIG. 2 with parts omitted for clarity of illustration.
Figure 12:
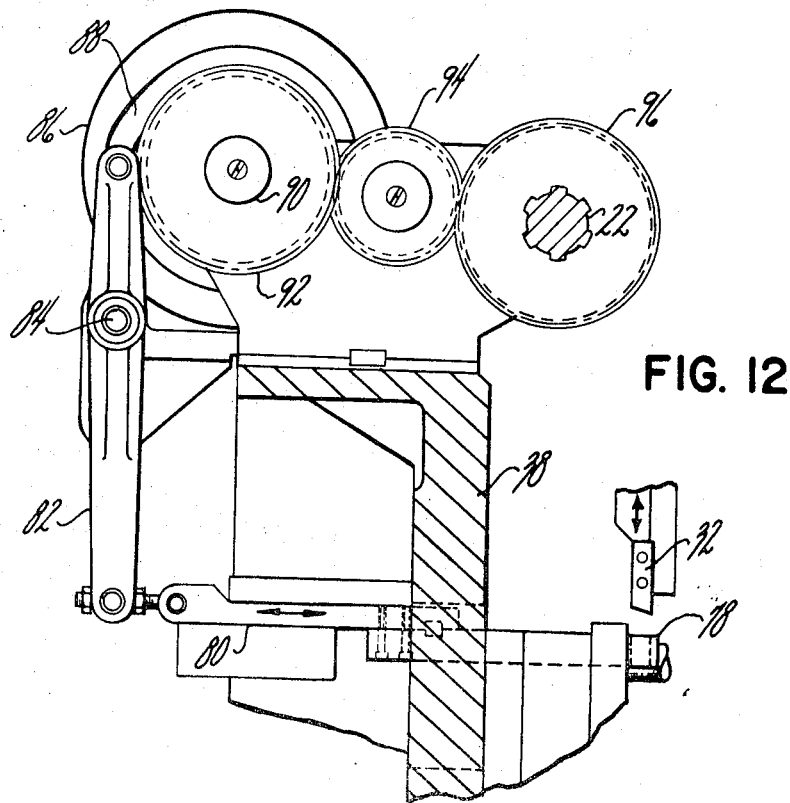
FIG. 12 is an enlarged fragmentary transverse vertical sectional view taken generally as indicated at 12—12 in FIG. 1 with parts omitted for clarity of illustration.

At a rear work station, a leading end section of an advancing strip is severed to provide a unitary workpiece in the form of a linear bearing race blank and the blank is thereafter formed to a partially circular configuration. In FIGS. 2 and 3 the strip 18 is shown advanced atop an anvil 78 and transversely atop a rear mandrel portion 34a. The vertically reciprocable cutoff tool 32 cooperates with the anvil 78 in the strip cutoff operation and is mounted on the aforesaid upper vertically reciprocable tool 40 for operation therewith. In operation, and in its downward or operative stroke, the tool 40 moves downwardly approximately to the position shown in FIG. 3 whereby to effect a cutoff operation through cooperation of the tool 32 and the anvil 78. Thereafter, the tool 40 is withdrawn upwardly to enable the cutoff tool 32 to clear the strip 18 and, subsequently, the tool 40 is again moved downwardly to effect partial forming of a severed bearing race blank. Once a leading end section of the strip 18 has been severed to provide a bearing race blank, the anvil 78 is withdrawn horizontally rearwardly from its operative position beneath the strip 18 whereby to provide clearance for downward arcuate movement of a trailing edge portion of the blank during subsequent partial forming of the latter, FIG. 3. As best illustrated in FIG. 12, the anvil 78 is adapted for horizontal reciprocable movement in forward and rearward directions by connection with a horizontal slide 80 at the rear of the machine frame 38. The slide 80 is in turn connected with an oscillable lever 82 pivotally supported at 84 and driven by a cam 86 having a track 88. The cam 86 is mounted on a stub shaft 90 which also carries a gear 92 rotated by an intermediate gear 94, in turn engaged with a drive gear 96 on the aforesaid upper horizontal cam shaft 22, FIGS. 12 and 13. Thus, it will be apparent that forward and rearward strokes of the anvil 78 can be provided for in suitably timed relationship with the vertical cutoff strokes of the tool 32 in the cyclic operation of the machine.

Figure 18:
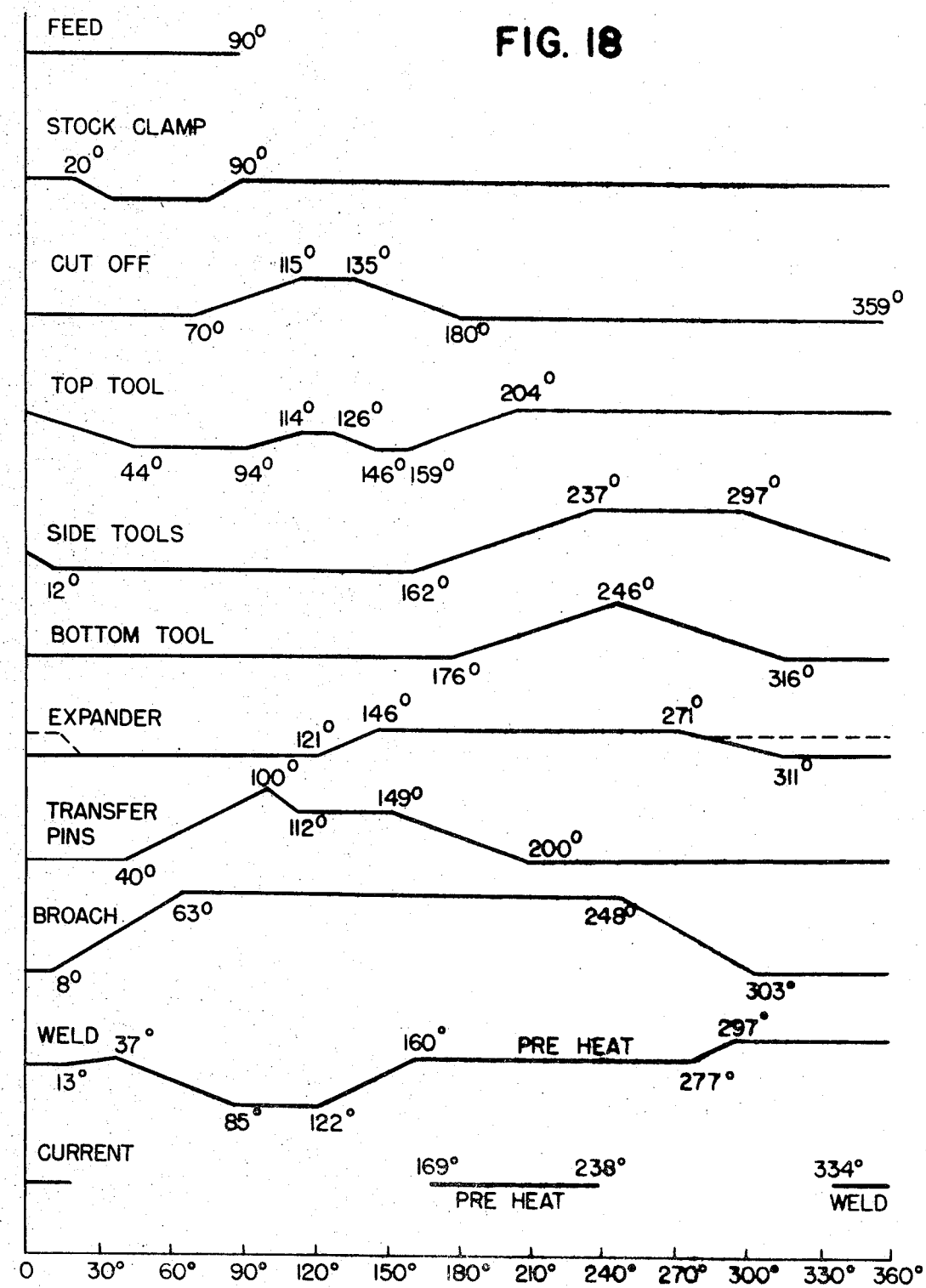
FIG. 18 is an illustrative timing chart for the machine of the present invention.

Returning now to FIGS. 2 and 3, it will be apparent that on withdrawal of the anvil 78 the second and forming portion of the stroke of the tool 40 can be effected. On occurrence of the forming portion of the tool stroke the bearing race blank is bent at least approximately to the position 18a of FIG. 3 about the enlarged rear mandrel portion 34a. Inward or operative strokes of the side tools 44, 46 are effected approximately at the same time and preferably slightly later than the stroke of the upper or top tool 40 whereby to complete the partial forming of the blank to the precise position shown in FIG. 3. Precise timing is of course provided for in conventional design of the cams 64, 68 and 70 and cam track configuration will be readily apparent from the timing chart of FIG. 18.

The aforementioned stock check 36 is operable during the aforesaid sequence of operations in a conventional manner to engage an advanced leading end section of the strip 18 and to securely hold the same in engagement with the enlarged mandrel rear section 34a.

In accordance with one aspect of the present invention, the forming machine has at least one tool in addition to the aforementioned vertically reciprocable tools disposed adjacent the mandrel and which is adapted to be entered between the end portions of a partially formed workpiece and carry out an operation on the workpiece. In the manufacture of bearing races two such additional tools are provided and take the form of broaching tools 98, 98, FIG. 3. The broaching tools 98,98 are arranged to engage and to work upon the end portions of a partially formed race such as 18a and to complete the aforementioned sizing and shaping functions prior to welding of the end portions together. It is to be noted also that the broaching tools provide clean, freshly exposed surfaces conducive to efficient welding in an extremely short increment of time prior to welding. Thus, there is little or no opportunity for oxidation or other contamination at the end portions prior to welding.

Figure 8:
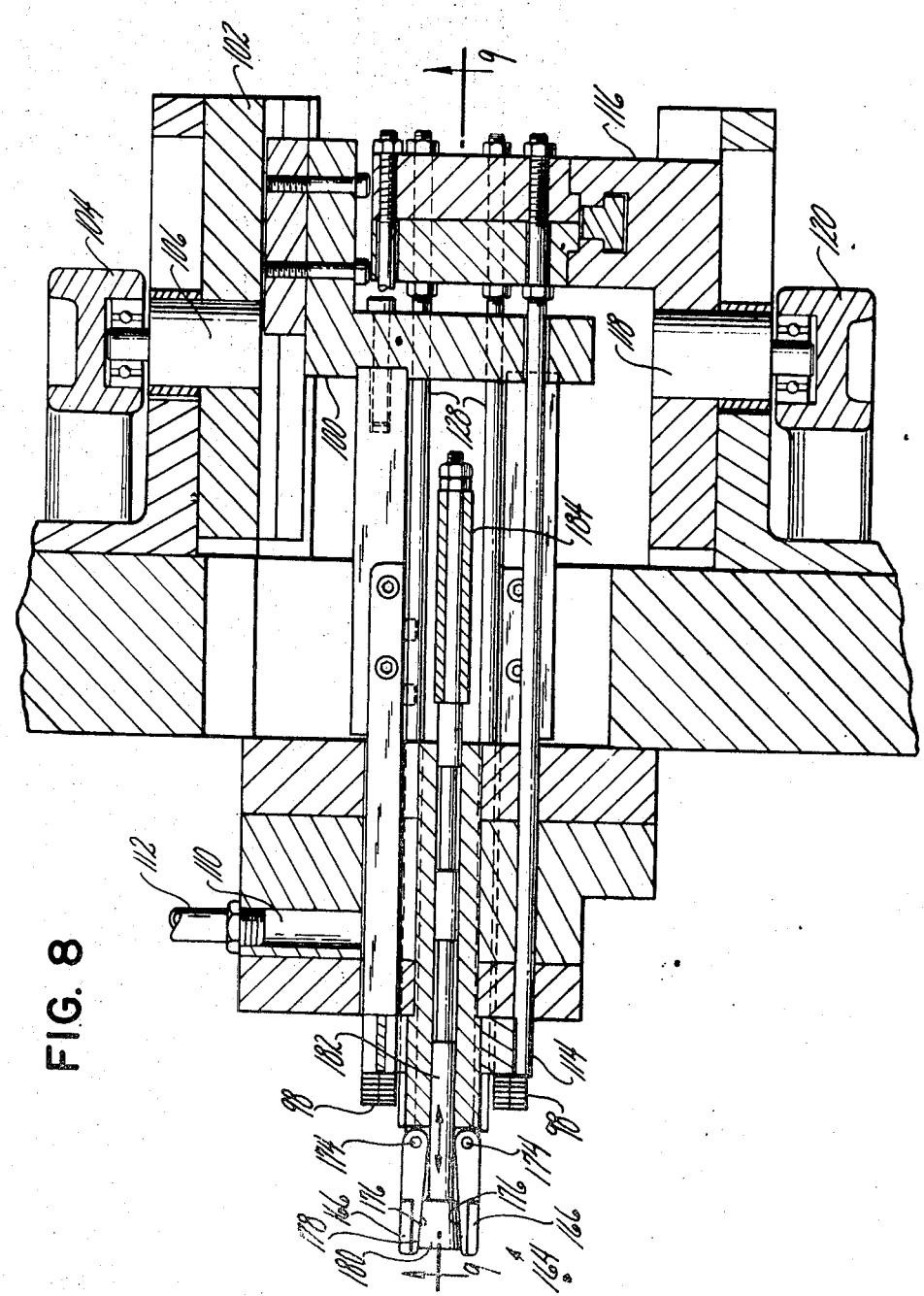
FIG. 8 is an enlarged fragmentary horizontal section taken generally as indicated at 8—8 in FIG. 7 and showing the second center form or mandrel embodiment at FIG. 6.

The broaching tools 98, 98 are arranged for horizontal reciprocable movement and, in their operative stroke, they are drawn rearwardly in engagement with end portions of a partially formed race such as 18a at the rear or preforming station of the mandrel 34. As best illustrated in FIG. 8, the broaching tools 98, 98 extend rearwardly through suitable openings in the rear mandrel portion 34a and the machine frame to an L-shaped bracket 100 attached to and movable forwardly and rearwardly with a slide 102. The slide 102 is pivotally connected with an upper end portion of an oscillable cam lever 104 by means of suitable pin 106, and the lever 104 extends downwardly behind the machine frame 38 and is driven at a lower end portion by means of a cam 108 on the lower horizontal cam shaft 48, FIG. 1. Thus, it will be apparent that the broaching tools 98,98 can be reciprocated in timed relationship with the tools 40, 44, 46, etc., and in the manner illustrated by the timing chart of FIG. 18 whereby effectively to broach end portions of a partially formed bearing race 18a.

A chip exhaust means is also preferably provided and may comprise parts 110,110 one shown in FIG. 8, communicating with the broaching tool at its rearward position and extending to an evacuating conduit 112. Conventional vacuum generating means may be conveniently located at a rear portion of the machine. Further, a jet of air is preferably blown across the broaching tools in their retracted position and an appropriate air inlet port (not shown) may be provided adjacent the tool in such position as to cooperate with the evacuating port 110.

On completion of preforming and broaching at the rear mandrel station, the aforementioned transfer device operates to advance a bearing race forwardly along the mandrel to an intermediate station for further forming. In its presently preferred form, the transfer device comprises four transfer pins 114,114 reciprocable in unison along the mandrel and arranged in a generally rectangular configuration to engage and urge a bearing race forwardly to the intermediate station. The pins 114,114 extend rearwardly through the machine frame 38 and through suitable openings in the L-shaped bracket 100 to a horizontally reciprocable L-shaped slide 116, FIG. 8. Rear portions of the pins are fixedly secured to the slide 116 and the latter is movable forwardly and rearwardly at the urging of a pivot pin 118 engageable with an upper end portion of an oscillable cam lever 120. The cam lever 120 extends downwardly behind the frame 38 of the machine and is driven at a lower end portion by means of a cam 122 on the lower cam shaft 48, FIG. 1. Thus, the pins 114,114 can be reciprocated to advance partially formed bearing races from the rear mandrel station to the intermediate station in timed relationship with the operation of tools and other machine elements.

Preferably, magnetic means are provided in the form of inserts on the pins 114,114, an electromagnet, or magnetized pins to provide for magnetic retention of a bearing race in precise registry on the ends of the transfer pins 114,114. The stock check 36 is, of course, operable in timed relation with the transfer pins to hold, release, and again hold respectively at the rear work station, during transfer, and at the intermediate work station.

Intermediate Mandrel Work Station

At the intermediate or forming mandrel work station, a partially formed bearing race is further formed to a circular configuration as indicated at 18b with end portions thereof in contiguous relationship for welding. Various tooling arrangements are of course possible, but it is the preferred practice to provide for further forming at the intermediate station by means of the aforementioned upper and lower tools 40, 42. At the intermediate work station, the mandrel 34 has a section 34b, FIG. 4, which is of cylindrical configuration and the upper tool 40 has a work engaging surface 126 which is approximately semicylindrical for engagement with an upper portion of a partially formed bearing race 18a. The lower tool 42 has a similar work engaging surface 128 which engages a lower portion of the bearing race for finish forming. The left- and right-hand tools 44 and 46 are inoperative at the intermediate work station.

As will be apparent, bearing race formation at the rear and intermediate stations can take place simultaneously, that is, while one bearing race is being partially formed as described above at the rear work station a second and preceding race can be finish formed at the intermediate work station along the mandrel.

For transferring bearing races or other workpieces from the intermediate work station to an additional or front work station along the mandrel, the aforesaid transfer device is provided with a second set of transfer pins. Four such pins are preferably provided and are indicated at 128,128 in a rectangular configuration spaced to engage a finish formed bearing race at the intermediate station.

The transfer pins 128,128 extend rearwardly through the frame of the machine as best illustrated in FIG. 8, two shown, and are fixedly attached at rear end portions to the slide 116 for operation in unison with the aforementioned transfer pins 114,114. As in the case of the pins 114,114, the transfer pins 128,128 are preferably magnetized so as to magnetically retain a bearing race such as to magnetically retain a bearing race such as 18b at the front end portions thereof. Further, it is to be observed that the length and stroke of the transfer pins 128,128 are determined so as to provide for a slight overtravel and return motion during transfer. That is, the transfer pins 128,128 engage a bearing race 18b at the intermediate station and, in an operative stroke, the pins urge the race forwardly along the mandrel to the position 18c and slightly beyond such position, FIG. 4, and thereafter withdraw the race to the position 18c. Thus, a preceding bearing race at the position 18c is engaged by an advancing bearing race and moved forwardly along the mandrel so as to be discharged from the front work station and to provide for a slight space between such preceding bearing race and the race advanced to the front work station. While such spacing of the races has obvious general advantages in the discharge of races from the front work station, there is also a particular advantage derived when welding is carried out at the front work station, such advantage being set forth hereinbelow.

Front Mandrel Work Station

While various tools may be provided for operation on workpieces at a front mandrel work station in a machine constructed in accordance with the invention, the said station is preferably employed as a preheat and/or welding station in the production of bearing races. In the manufacture of low carbon steel bearing races, the aforementioned welding mechanism 72 is employed for welding only but in the manufacture of high carbon steel bearing races, preheating is necessary or at least desirable, and, accordingly, both preheating and welding operations are carried out at the front work station. The manufacture of welded high carbon steel bearing races of high quality and structural integrity is a particularly difficult task and preheating and welding steps must be carried out within exacting requirements. The welding method employed in the operation of the welding mechanism 72 is fully described in aforementioned copending U.S. application Ser. No. 706,217 entitled "Welding Method For Bearing Races and Other Articles" in the name of Erman V. Cavagnero.

Figure 4:
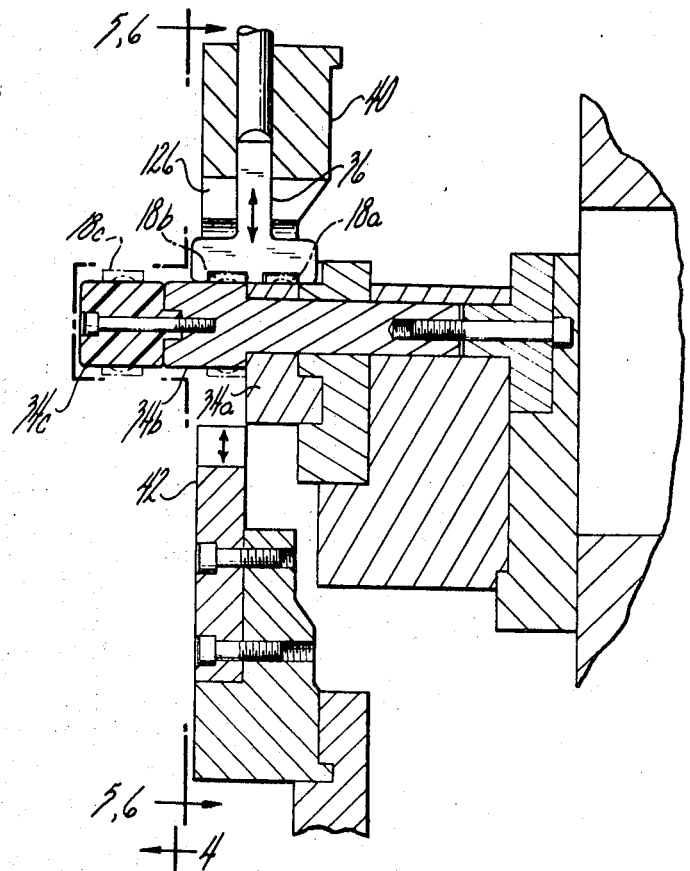
FIG. 4 is an enlarged vertical transverse section taken generally as indicated at 4—4 in FIG. 1 with parts omitted for clarity of illustration, and which illustrates a first embodiment of a center form or mandrel.
Figure 5:
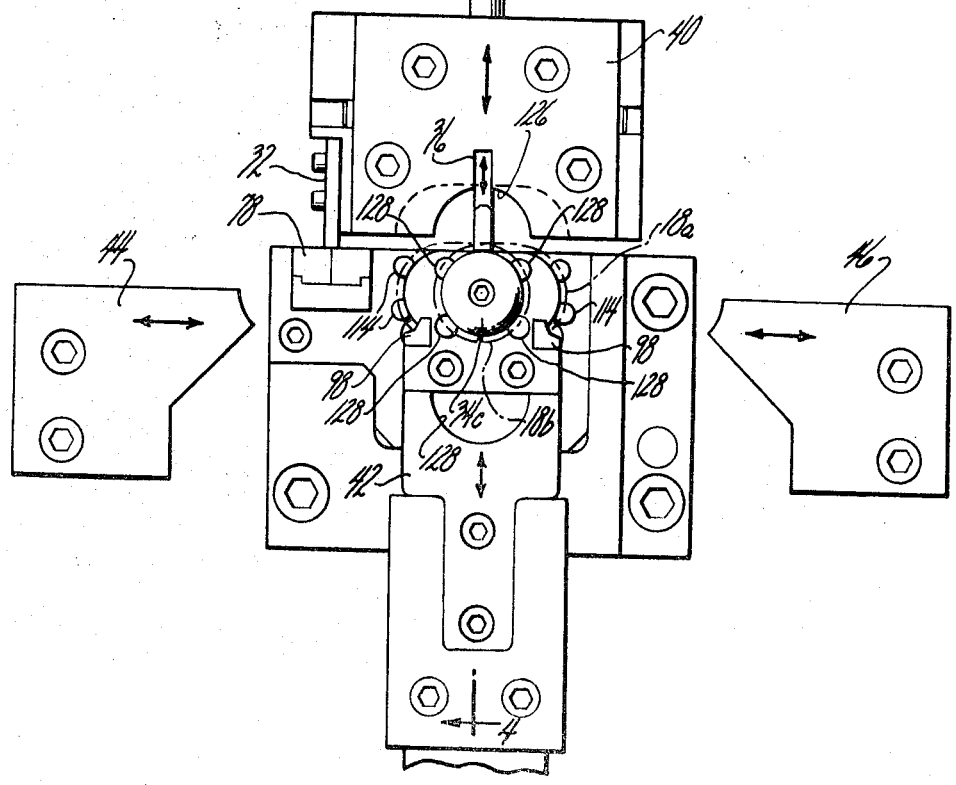
FIG. 5 is an enlarged fragmentary longitudinal vertical section taken generally as indicated at 5—5 in FIG. 4.
Figure 6:
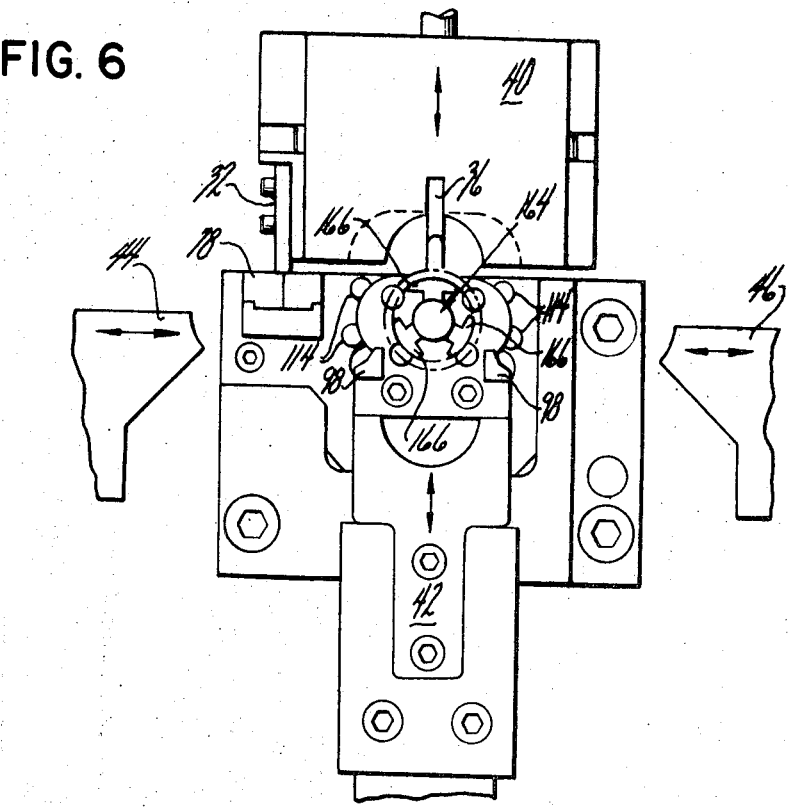
FIG. 6 is an enlarged fragmentary longitudinal vertical section similar to FIG. 5 but showing a second embodiment of a center form or mandrel.
Figure 7:
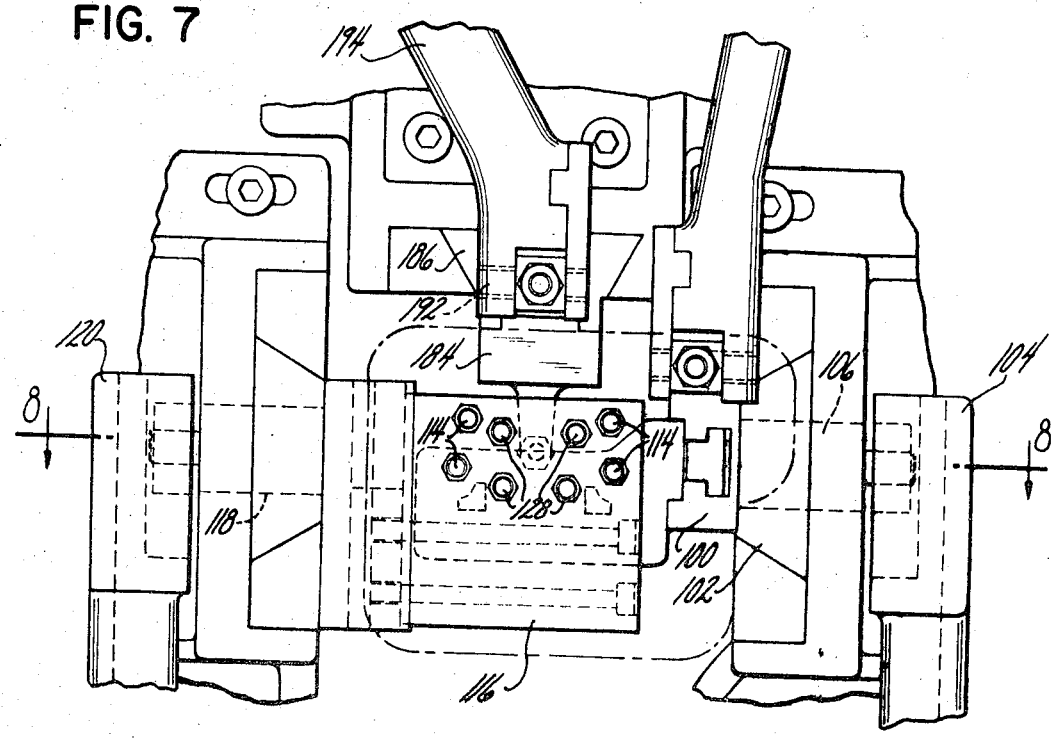
FIG. 7 is an enlarged fragmentary vertical elevational view of a rear portion of the machine showing operating means for workpiece engageable devices such as tools disposed at a front portion of the machine adjacent the mandrel.
Figure 10:
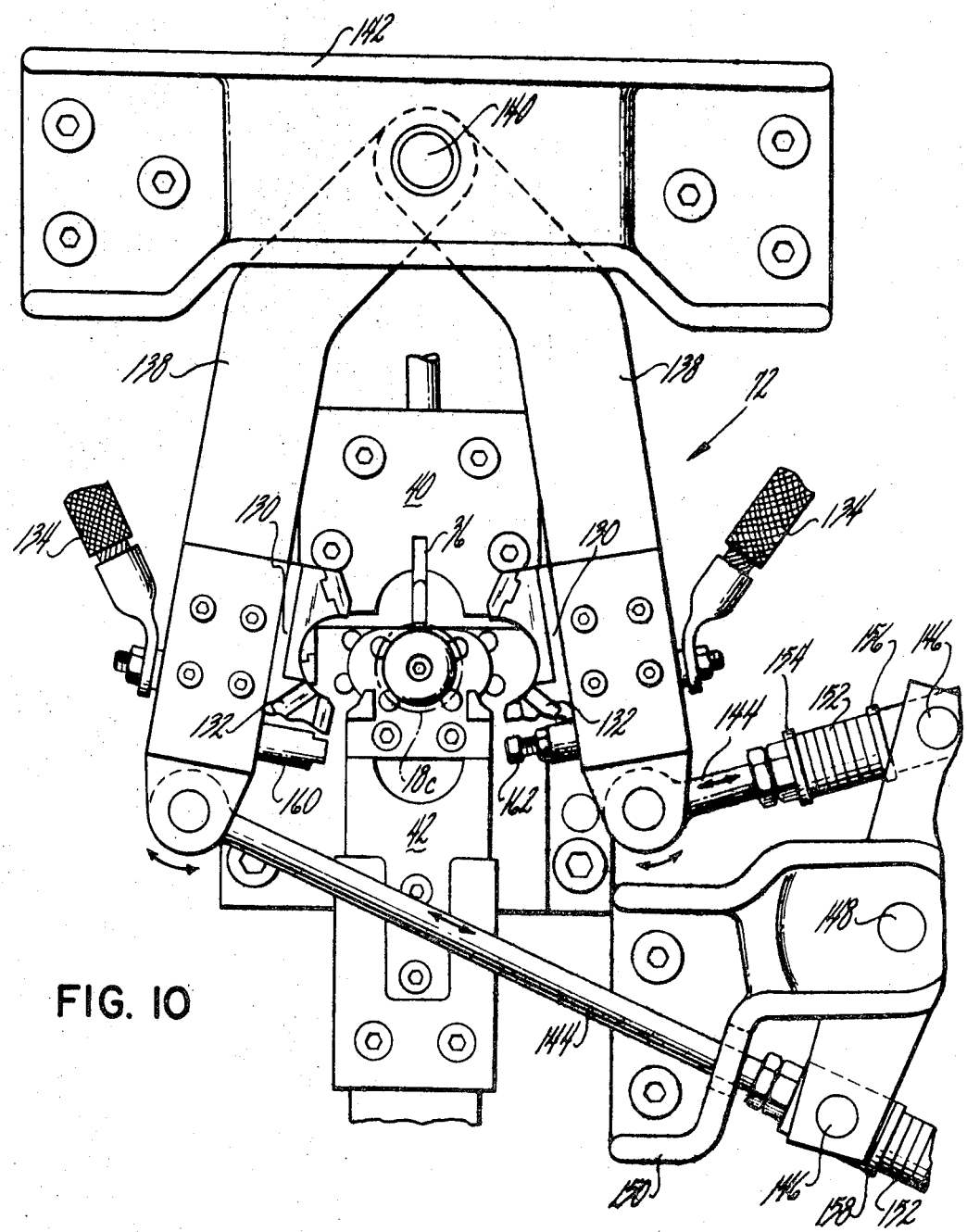
FIG. 10 is an enlarged fragmentary vertical elevational view taken at the front of the machine and illustrating a preheat and welding mechanism.

In FIGS. 4 and 5, a fixed cylindrical mandrel section 34c is shown at the front work station and said mandrel configuration may be employed in the manufacture of low carbon bearings wherein a welding operation only is carried out at the said station. Thus, welding clamps 130,130 in the mechanism 72, FIG. 10, are swung inwardly into engagement with a bearing race at the front work station for welding together the end portions of the race. The clamps 130,130 have associated electrodes 132,132 connected by suitable cables 134,134 to a conventional electrical welding supply unit 136 shown atop the forming machine in FIG. 1. Swingable arms 138,138 respectively carry the clamps 130,130 and the electrodes 132,132 and are pivotally supported at 140 above the mandrel by means of a bracket 142 secured to the machine frame. At lower end portions the arms 138,138 are pivotally connected respectively with operating rods 144,144. The rods 144,144 are in turn connected with the aforementioned cam lever 78 which is of a generally T-shaped configuration and which carries spaced pivot pins 146,146 on the arms of the T portion thereof for connection with the rods. At a location intermediate the ends of the arms of the T portion a pivot pin 148 supports the lever 76 for oscillation thereabout at the urging of the cam 76. The pivot pin 148 is in turn supported by a bracket 150 secured to the machine frame.

As will be apparent in FIGS. 1 and 10, an upward movement at the right-hand end portion of the cam lever 74 at the urging of the cam 76 will result in a counterclockwise movement of the lever exerting a "push" action on the upper rod 144 connected to the right-hand arm 138 and in a "pull" action exerted on the lower rod 144 connected to the left-hand arm 138. Such actions of course tend to close the clamps 130,130 and the electrodes 132,132 about a bearing race on the mandrel 34 for a welding operation at the end portions thereof. Conversely, a downward movement at the right-hand end portion of the lever 74 at the urging of the cam 76 results in clockwise movement of the lever about the pivot 148 and in an opening movement of the clamps 130,130 and the electrodes 132,132.

Preferably, a resilient biasing means is incorporated in association with the rods 144,144 and such means takes the form of a series of small annular tubes arranged in axial stacks at 152,152. The stack of tubes 152 associated with the upper rod 144 in FIG. 10 is maintained in compression between seats 154, 156 on closing movement of the clamps and electrodes and the stack of tubes 152 on the lower rod 144, while disposed on an opposite side of the pivot pin will nevertheless reside in compression between a seat 158 and a further seat, not shown, when the clamps and electrodes are closed. Engageable fixed and adjustable closing stops for the clamps and electrodes are provided respectively at 160 and 162.

Figure 16:
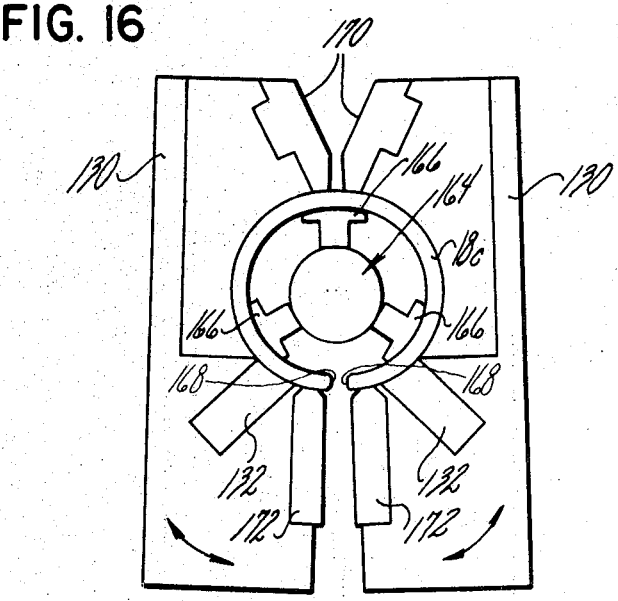
FIG. 16 is an enlarged fragmentary vertical front elevational view illustrating electrodes and clamps of the welding mechanism of FIG. 10, the electrodes and clamps being shown in a preheat condition.

When both preheating and welding are to be accomplished at the front mandrel station in the manufacture of high carbon steel bearing races, it is the preferred practice to provide a mandrel such as that shown at 164 in FIGS. 6, 8, 9, 11, 16 and 17. The mandrel 164 has a movable workpiece engageable part operable from behind the machine frame and usable for a wide variety of purposes but which takes the form of a race expansion device in the manufacture of high carbon steel bearing races. Three expansion elements 166,166 are preferably provided for engagement with the interior surface of a bearing race at the front work station and for expansion of the race to during a preheating operation. As best illustrated in FIG. 16 the elements 166,166 engage interior surfaces of the bearing race at the front station while the clamps 130,130 and the electrodes 132,132 engages exterior surfaces thereof with end portions 168,168 of the race thereby maintained in spaced relationship. The expansion of the elements 166,166 is such that the space between the end portions 168,168 of the race is sufficient to prevent arcing and current flow thereacross and in consequence, current flow occurs instead from one electrode 132 through an opposite or upper portion of the race to the other electrode 132 for preheating of the race. The electrodes 132,132 are similarly located and arranged generally on opposite sides of the bearing race and they are preferably disposed substantially closer to the end portions of the race than to a point on the race diametrically opposite the end portions. It is found that "cold spots" may occur in the race beneath the electrodes and in order to limit the circumferential extend thereof it is believed that each electrode should not extend over more than one-fourth the bearing race circumference. Further, it is believed that optimum results are achieved when each electrode extends over approximately one-eighth the race circumference as shown.

Figure 17:
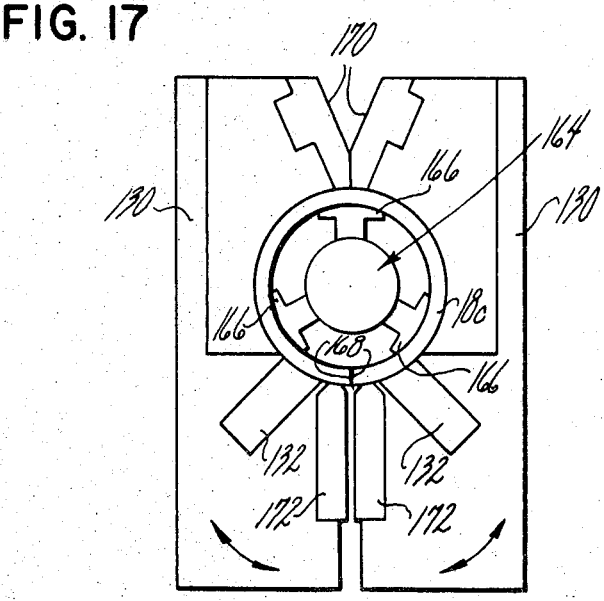
FIG. 17 is an enlarged fragmentary front elevational view showing the electrodes and clamps of FIG. 16 in a weld condition. 5

Further with regard to FIGS. 16 and 17, it will be observed that a pair of small elements 170,170 are provided at an upper portion of the clamps 130,130 and that a similar pair of elements 172,172 are provided at a lower portion thereof adjacent the end portions of the bearing race 168. Said elements comprise wear resistent inserts, it having been determined that maximum clamp wear occurs at the locations thereof.

It will be apparent from the foregoing that suitable timing of electrode and clamp engagement with a bearing race, together with a properly determined welding current, will provide a preheating operation of desired characteristics as set forth in the aforementioned method application Ser. No. 706,217. When preheating is complete, the expansion elements 166,166 are collapsed to the position shown in FIG. 17 and additional force is exerted upon the bearing race by the clamps 130,130 through their aforedescribed operating means, reference being had to the timing chart of FIG. 18.

Thus, the end portions 168,168 of the bearing race are urged into firm pressure engagement as illustrated in FIG. 17 and current flow commences from one electrode 132 through the said end portions 168,168 to the opposite electrode 132, the path through the end portions being substantially shorter than the path through the opposite or upper portion of the race. Thus, the end portions of the race are welded together in a resistance upset butt welding operation and a completed bearing race is provided.

Still referring to FIG. 17, it will be observed that the expansion elements 166,166 are shown in engagement with an interior surface of the bearing race 18c during the welding operation. It is the presently preferred practice to collapse the elements 166,166 sufficiently so that no substantial force is exerted thereby upon the interior surface of the bearing race during welding. It is contemplated, however, that some advantage may be derived in partially collapsing the elements 166,166 whereby to exert a slight but sufficient force upon the interior race surface during welding and thereby to aid in the uniform distribution of pressure by the clamps about the exterior race surface. In the timing chart of FIG. 18 the broken line portion adjacent the term "Expander" represents the latter condition wherein slight pressure is applied during welding, and the full line portion thereof represents the former condition wherein substantially no pressure is applied by the elements 166,166 during welding. Conventional cam design practice can, of course, be followed in providing for either alternative condition through operation of an actuating means for the elements 166,166 to be described presently.

Figure 9:
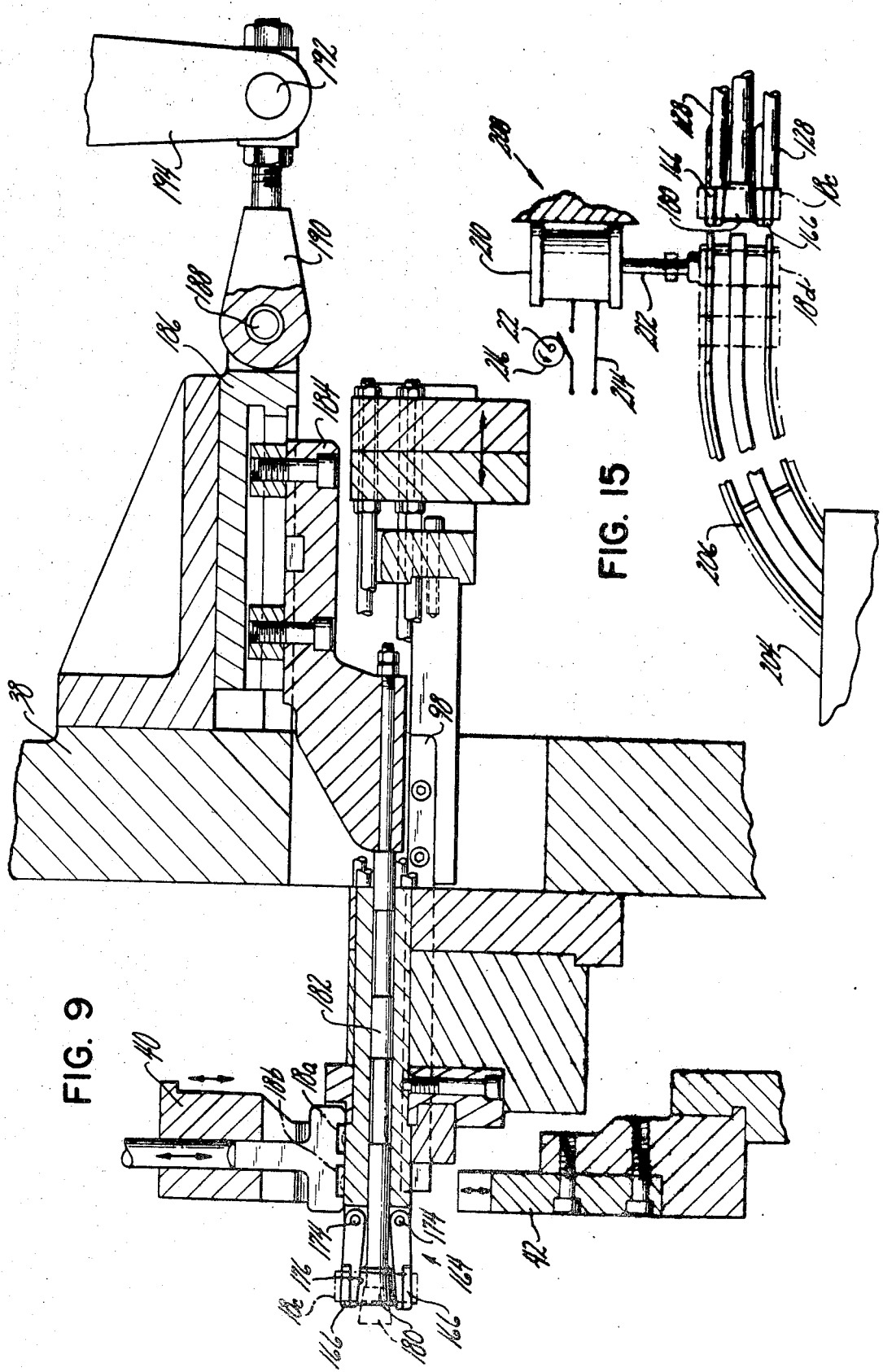
FIG. 9 is an enlarged fragmentary transverse vertical sectional view taken generally as indicated at 9—9 in FIG. 8 with parts omitted for clarity of illustration.
Figure 11:
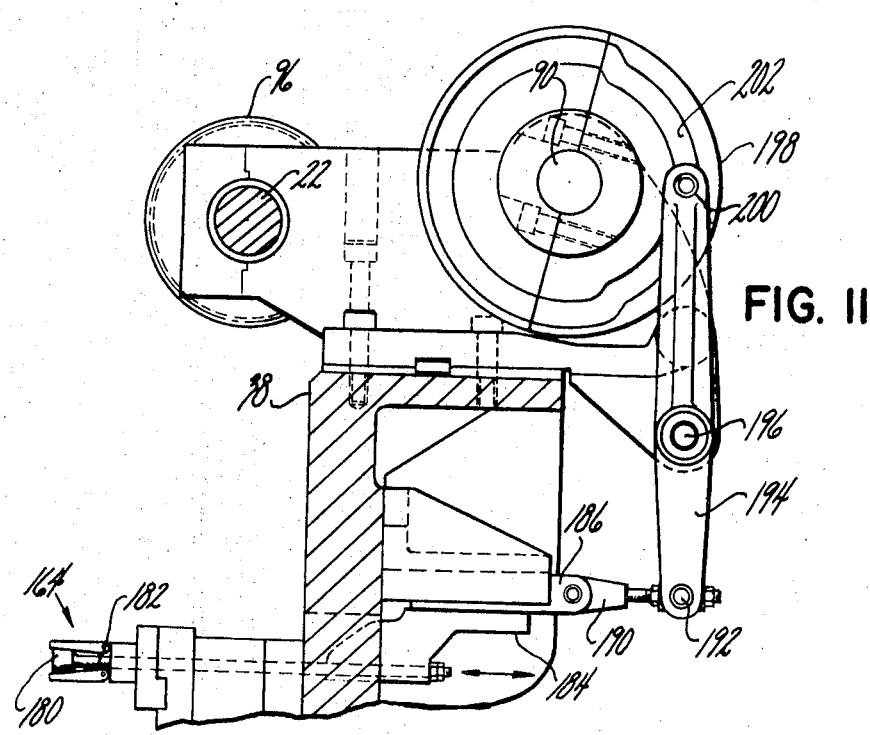
FIG. 11 is an enlarged fragmentary transverse vertical sectional view taken generally as indicated at 11—11 in FIG. 1 with parts omitted for clarity of illustration.
Figure 13:
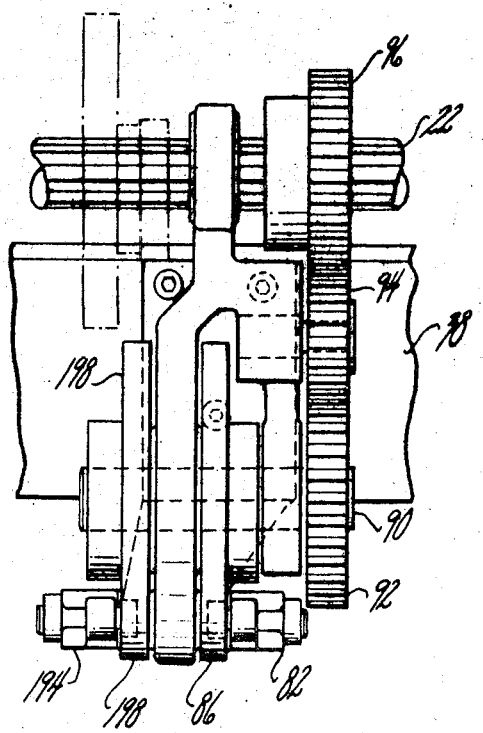
FIG. 13 is an enlarged fragmentary top view taken generally as indicated at 13—13 in FIG. 1 and partially illustrating the operating means of FIG. 7.
Figure 14:
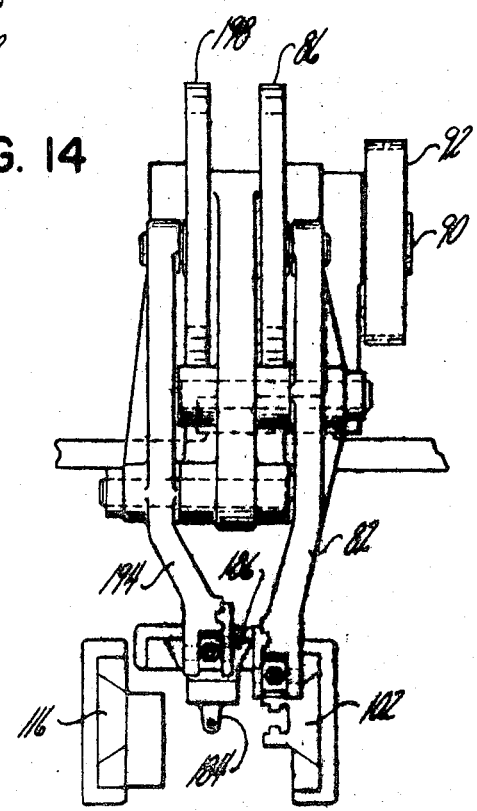
FIG. 14 is an enlarged fragmentary vertical elevational view taken at the rear of the machine and further illustrating the operating means of FIGS. 7 and 13.

In FIGS. 8 and 9, it will be observed that the expansion elements 166,166 are pivotally supported for generally radial movement by means of small pins 174,174 at rear end portions thereof. Inner surfaces 176,176 of the elements are inclined from the horizontal for camming cooperation with a similarly inclined surface 178 on a frustoconical member 180 at a forward end portion of an actuator 182. The actuator extends rearwardly through a suitable axial opening in the mandrel 164 and is connected at a rear end portion with a bracket 184, FIG. 9, in turn connected with a slide 186 disposed behind the machine frame 38. The slide 186 carries a pivot pin 188 which in turn carries a short connecting link 190 pivotally connected at 192 to an oscillable cam lever 194. As best illustrated in FIG. 11, the cam lever 194 is pivotally supported at 196 and extends upwardly to a cam 198 wherein its cam follower 200 is entered in a track 202 for timed oscillation of the lever 194. The cam 198 is mounted on and driven by the aforementioned stub shaft 90 as best illustrated in FIGS. 13 and 14. Thus, it will be apparent that the lever 194, the slide 186 and the actuator 182 can be operated from the upper cam shaft 22 for operation of the expansion device of the mandrel 164 in timed relationship with the welding mechanism, transfer device, etc. When the frustoconical member 180 is drawn rearwardly to the position shown in FIG. 8 and in FIG. 9 in full line, the elements 166,166 are urged to their outer or radially expanded condition of FIG. 16. Conversely, operation of the cam, lever, slide, etc., in an opposite direction urging the actuator 182 and frustoconical member 180 forwardly to the FIG. 9 broken line position allows the elements 166,166 to move inwardly to the collapsed condition of FIG. 17.

Discharge Track and Induction Furnace

In the manufacture of bearing races it is presently the preferred practice to provide for a postheat means and such means in the form of an induction furnace 204 is illustrated schematically in FIG. 15. A bearing race discharge track 206 extends rearwardly from the furnace to an end surface of a mandrel such as the mandrels 34, 166 and is arranged to receive bearing races advanced along the mandrel from the front work station thereon. Further, a retaining means is preferably provided for securing a bearing race such as the race 18c in position on the track. When a race is advanced to the front work station so as to urge a preceding race at the station forwardly along the mandrel and to space the same from the station as described above, the said preceding bearing is moved to and held at the position 18d. Particularly in the case of high current welding, magnetic forces are generated in the area of the welding clamps and electrodes and such forces tend to withdraw a race such as the race 18d rearwardly into engagement with the clamps, etc. A retaining means such as 208 secures a race 18d in position on the track 206 and prevents the same from moving rearwardly under the influence of such magnetic forces.

The retaining means 208 may vary widely in design and construction but presently takes the form of a small fluid operable cylinder 210 having a reciprocable rod 212 engageable with a bearing race 18d to secure the same in position. The cylinder 210 may be operated by electrical control means represented schematically at 214 under the regulation of a small cam 216 which may be mounted upon one of the aforementioned cam shafts such as the shaft 22. Thus, the cam 216 controls the operation of the cylinder 210 to urge the rod 212 downwardly into engagement with a bearing race as it is advanced to the position 18d and when a subsequent race is advanced the rod will release the race at 18d allowing preceding races to be moved thereby along the track 206, and the rod will then return to its operative position in engagement with the advanced bearing race.

We claim:

1. In a machine for producing welded bearings and the like, the combination of a mandrel shaped to accommodate bearings disposed thereabout, said mandrel having a work station at a selected axial position therealong, an expansion device at said work station having collapsed and expanded conditions and adapted in its expanded condition to engage an unwelded bearing at the station and to expand the same whereby to separate adjacent end portions thereof, a transfer device for advancing bearings in succession along said mandrel to said work station, a pair of electrodes at said work station movable cooperatively toward and away from a bearing at the station and engageable with generally opposite portions of the bearings, and means for operating said expansion device and electrodes in timed relationship whereby to expand the bearing and engage the electrodes therewith for a welding preheat operation, said expansion device serving to separate said bearing end portions sufficiently to prevent arcing and current flow thereacross whereby to maintain the end portions relatively cold with current flow and preheat occurring in an opposite portion of the bearing spaced from the end portions.

2. The combination in a machine for producing welded bearings and the like as set forth in claim 1 wherein said operating means is adapted further to collapse said expansion device with a bearing at said work station whereby to permit the bearing end portions to engage for current flow therethrough and for welding of the same together.

3. The combination in a machine for producing welded bearings and the like as set forth in claim 2 wherein the same pair of electrodes engage a bearing at said work station for both preheat and weld operations, the former operation with the bearing expanded and the latter with bearing end portions in engagement for welding.

4. The combination in a machine for producing welded bearings and the like as set forth in claim 3 wherein a clamping device is operatively associated with said electrodes at said work station and actuated by said operating means to exteriorly engage and to exert substantial pressure on a bearing at said work station for welding of the bearing end portions.

5. The combination in a machine for producing welded bearings and the like as set forth in claim 4 wherein said operating means is adapted to maintain said expansion device in engagement with an interior surface of a bearing during welding of the bearing whereby to equalize pressure on the exterior surface of the bearing by said electrodes and clamping device.

6. The combination in a machine for producing welded bearings and the like as set forth in claim 4 wherein said transfer device comprises a set of axially reciprocal transfer pins provided with magnetic means and engageable with an unwelded bearings to urge the same into engagement with preceding bearings at said preheat station and to eject the latter from said station, said pins being movable through a sufficient stroke to urge the unwelded bearings beyond the preheat station and then to withdraw the unwelded bearings to the preheat station under magnetic force whereby to provide a space between said unwelded and ejected preceding bearings.

7. The combination in a machine for producing welded bearings and the like as set forth in claim 6 and including a retaining means operable in timed relationship with said transfer pins to engage each said preceding bearing transferred from said preheat station and to retain the same in spaced relationship with the said station against magnetic forces generated during subsequent preheat and weld operations.

8. The combination in a machine for producing welded bearings and the like as set forth in claim 1 wherein said electrodes are arranged to engage a bearing at said work station along similar exterior bearing surface areas which are spaced from and on opposite sides of said end portions but which are nevertheless somewhat closer to said end portions than to a point on said bearing diametrically opposite said end portions.

9. The combination in a machine for producing welded bearings and the like as set forth in claim 8 wherein each of said electrodes is shaped to engage a bearing along an area located as aforesaid and which extends over less than one-fourth the circumference of the bearing.

10. The combination in a machine for producing welded bearings and the like as set forth in claim 9 wherein each of said electrodes is shaped to engage the bearing along an area which extends over approximately one-eighth of the bearing circumference.

11. The combination in a machine for producing welded bearings and the like as set forth in claim 1 wherein said expansion device comprises at least two generally radially movable elements carried by said mandrel and an actuator movable to urge said elements generally radially outwardly and into engagement with the interior surface of a bearing at the work station.

12. The combination in a machine for producing welded bearings and the like as set forth in claim 11 wherein said elements and actuator have engageable camming means operable on actuator movement to urge the elements outwardly.

13. The combination in a machine for producing welded bearings and the like as set forth in claim 12 wherein three said elements are provided with pivotal connection with the mandrel and with inwardly facing actuator engageable surfaces, and wherein said actuator is disposed within said mandrel for axial movement with inclined surfaces engageable with said element inner surfaces for generally radial element movement in response to axial actuator movement.

14. The combination in a machine for producing welded bearings and the like as set forth in claim 1 and including at least one tool associated with said mandrel and arranged to engage surfaces to be welded at the end portions of a bearing on the mandrel, and means for effecting relative generally axial movement between said tool and said surfaces whereby to provide clean freshly exposed surfaces prior to welding together of said end portions.

15. The combination in a machine for producing welded bearings and the like as set forth in claim 14 wherein two tools are provided for generally axial movement relative to said mandrel and for respective engagement with the surfaces at the end portions of an unwelded bearing which is spaced axially along said mandrel from said work station, said tools taking the form of broaching tools operable in their axial movement to remove material from said end portions to provide clean freshly exposed surfaces prior to transfer of said bearing to said work station for preheat operation.

16. The combination in a machine for producing welded bearings and the like as set forth in claim 15 wherein a forming work station is provided along said mandrel in axially spaced relationship with said preheat work station, wherein said transfer device is operable to advance bearings in succession from said forming station to said preheat station, and wherein said broaching tools are operable at least approximately adjacent said forming station.

17. The combination in a machine for producing welded bearings and the like as set forth in claim 16 wherein a preforming work station is provided along said mandrel on a side of said forming station opposite said preheat station, wherein forming tools are provided adjacent said preforming station for successively producing partially formed bearings with end portions widely spaced apart, wherein said transfer device is operable to advance bearings along said mandrel successively from said preforming station to said forming station, and wherein said broaching tools are so located as to operate on said widely spaced end portions of said partially formed bearings.

18. The combination in a machine for producing welded bearings and the like as set forth in claim 17 and including feed and cutoff means associated with said preforming station, said feed means being operable to advance intermittently to said station and transversely of said mandrel a leading end section of an elongated strip of bearing material, and said cutoff means being operable intermittently in timed relationship with said feed means to sever said advanced leading end sections whereby successively to provide linear bearing blanks at said preforming station.

19. The combination in a machine for producing welded bearings and the like as set forth in claim 18 and including a plurality of generally radially reciprocal forming tools arranged in a hub-spoke spoke configuration about said mandrel adjacent said preforming and forming stations, said tools being shaped at said preforming station successively to bend said linear bearing blanks about said mandrel to a partially circular configuration with end portions spaced apart a distance greater than a radius of a finished bearing, and said tools being shaped at said forming station successively to bend said partially formed bearings to a circular configuration with end portions substantially in engagement.

20. The combination in a machine for producing welded bearings and the like as set forth in claim 17 wherein said transfer device comprises first and second sets of axially reciprocal transfer pins adapted respectively for engagement with partially and fully formed bearings at said preforming and forming stations, said first set of pins serving to advance partially formed bearings from said preforming station to said forming station, and said second set of pins serving to advance fully formed bearings from said forming station to said preheat station.

21. The combination in a machine for producing welded bearings and the like as set forth in claim 20 wherein said second set of transfer pins is provided with magnetic means for engaging an unwelded bearing at said forming station, and wherein said second set of pins is adapted to advance an unwelded bearing from said forming station to a point beyond said preheat station whereby to engage a preceding bearing at said preheat station and to eject the same from said station, said second set of pins being adapted further to withdraw said unwelded bearing under magnetic force to said preheat station whereby to provide a space between said unwelded bearing and said preceding bearing.

22. The combination in a machine for producing welded bearings and the like as set forth in claim 21 and including a retaining means operable in timed relationship with said transfer pins to engage each said preceding bearing ejected from said preheat station and to retain the same in spaced relationship with the said station against magnetic forces generated during subsequent preheat and weld operations.

23. The combination in a machine for producing welded bearings and the like as set forth in claim 22 and including a track means associated with an end portion of said mandrel adjacent said preheat station and adapted successively to receive bearings ejected from said station, and including further a bearing post-heat means associated with said track and adapted successively to receive bearings thereon.

PO-1050
(5/69)

UNITED STATES PATENT OFFICE
CERTIFICATE OF CORRECTION

Patent No. 3,562,473          Dated February 9, 1971

Inventor(s) Erman V. Cavagnero and Joseph F. Loftus

It is certified that error appears in the above-identified patent and that said Letters Patent are hereby corrected as shown below:

Col. 2, line 3, Figure 9 description should start a new paragraph.

Col. 2, line 32, delete the number "5"

Col. 2, line 45, "specifications" should be singular

Col. 2, line 64, "tread" should be --thread--

Col. 4, line 14, "84" should be --34--

Col. 5, line 4, "parts" should be --ports--

Col. 5, line 67, after "station" insert --for subsequent transfer forwardly to an additional work station--

Col. 6, lines 7 and 8, delete "as to magnetica retain a bearing race such"

Col. 8, line 18, "sufficient" should be --significant--

Col. 9, line 40, "bearings" should be singular

Col. 11, line 33, delete the second occurrence of "spoke"

Signed and sealed this 6th day of July 1971.

(SEAL)
Attest:

EDWARD M. FLETCHER, JR.
Attesting Officer

WILLIAM E. SCHUYLE
Commissioner of Pa